United States Patent
Kusch et al.

(10) Patent No.: US 10,476,401 B2
(45) Date of Patent: Nov. 12, 2019

(54) DEVICE FOR CONVERTING VOLTAGE, TRACTION NETWORK AND METHOD FOR CHARGING A BATTERY

(71) Applicant: Volkswagen Aktiengesellschaft, Wolfsburg (DE)

(72) Inventors: Rüdiger Kusch, Braunschweig (DE); Hendrik Schröder, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/334,892

(22) PCT Filed: Apr. 21, 2017

(86) PCT No.: PCT/EP2017/059468
§ 371 (c)(1),
(2) Date: Mar. 20, 2019

(87) PCT Pub. No.: WO2018/054558
PCT Pub. Date: Mar. 29, 2018

(65) Prior Publication Data
US 2019/0305690 A1    Oct. 3, 2019

(30) Foreign Application Priority Data
Sep. 23, 2016 (DE) .......................... 10 2016 218 304

(51) Int. Cl.
*H02M 7/219* (2006.01)
*H02M 7/217* (2006.01)
(Continued)

(52) U.S. Cl.
CPC ........... *H02M 7/2173* (2013.01); *B60L 53/24* (2019.02); *H02J 7/0055* (2013.01); *H02M 7/219* (2013.01);
(Continued)

(58) Field of Classification Search
CPC ...... H02M 7/2173; H02M 7/00; H02M 7/219; H02M 7/4826; H02M 7/53875;
(Continued)

(56) References Cited

U.S. PATENT DOCUMENTS 8,493,032 B2    7/2013    Krauer .......................... 320/137
9,318,974 B2 *  4/2016    Yoscovich ............ H02M 7/483
(Continued)

FOREIGN PATENT DOCUMENTS

CN    103770656 A    5/2014    .............. B60L 11/18
DE    102009033185 A1    11/2010    .............. B60L 11/18
(Continued)

OTHER PUBLICATIONS

Nabae, Ikira et al., "A New Neutral-Point-Clamped PWM Inverter," IEEE Transactions on Industry Applications, vol. 1A-17, No. 5, pp. 518-523, Sep. 28, 1981.
(Continued)

*Primary Examiner* — Adolf D Berhane
(74) *Attorney, Agent, or Firm* — Slayden Grubert Beard PLLC

(57) ABSTRACT

The invention relates to a device for converting voltage comprising a converter and a controller, wherein the converter has three half bridges, each with four transistors, and at least one half bridge has two switching elements, wherein by means of a first switching element, a central tap between two diodes is connected in a first switched position to a neutral point of a DC link capacitor and, in a second switched position, to a positive charging connection for an external DC voltage source, and by means of a second switching element, a central tap of the half bridge is connected in a first switched position to a pole of an AC voltage connection, and in a second switched position to a negative pole of a DC voltage connection. Moreover, the invention
(Continued)

relates to a traction network as well as a method for charging a battery of a traction network by means of an external DC voltage source.

7 Claims, 2 Drawing Sheets

(51) Int. Cl.
*H02M 7/48* (2007.01)
*H02M 7/483* (2007.01)
*H02J 7/00* (2006.01)
*B60L 53/24* (2019.01)
*H02M 7/5387* (2007.01)

(52) U.S. Cl.
CPC ......... *H02M 7/483* (2013.01); *H02M 7/4826* (2013.01); *H02M 7/53875* (2013.01); *H02M 2007/4835* (2013.01)

(58) Field of Classification Search
CPC ................... H02M 7/483; H02M 7/66; H02M 2007/4835; B60L 53/24; H02P 27/14; H02J 7/0065; H02J 7/0055
See application file for complete search history.

(56) References Cited

U.S. PATENT DOCUMENTS

| | | | |
|---|---|---|---|
| 2012/0218795 A1* | 8/2012 | Mihalache | ............ H02M 7/487 363/97 |
| 2013/0094265 A1 | 4/2013 | Lai et al. | ....................... 363/131 |
| 2018/0248493 A1* | 8/2018 | Mihalache | .............. H02M 1/08 |

FOREIGN PATENT DOCUMENTS

| | | | |
|---|---|---|---|
| DE | 102011118823 A1 | 5/2013 | ............. B60L 11/18 |
| DE | 102012202764 A1 | 8/2013 | ............. B60L 11/18 |
| DE | 102012212291 A1 | 2/2014 | ............. B60L 11/18 |
| DE | 102016218304 B3 | 2/2018 | ............. B60L 11/18 |
| EP | 0593472 B1 | 4/1995 | ............. B60L 11/18 |
| WO | 2018/054558 A1 | 3/2018 | ............. B60L 11/18 |

OTHER PUBLICATIONS

International Search Report and Written Opinion, Application No. PCT/EP2017/059468, 9 pages, dated Jun. 9, 2017.

* cited by examiner

DEVICE FOR CONVERTING VOLTAGE, TRACTION NETWORK AND METHOD FOR CHARGING A BATTERY

CROSS-REFERENCE TO RELATED APPLICATIONS

This application claims priority to German Application No. 10 2016 218 304.4, filed on Sep. 23, 2016 with the German Patent and Trademark Office. The contents of the aforesaid application are incorporated herein for all purposes.

BACKGROUND

The invention relates to a device for converting voltage, a traction network in an electric or hybrid vehicle, as well as a method for charging a battery in a traction network.

Traction networks in an electric or hybrid vehicle comprise a battery, an inverted rectifier and an electric machine that is normally designed as a three-phase electric machine. The inverted rectifier in this case comprises a DC link capacitor as well as three half bridges, wherein two transistors with freewheeling diodes are arranged in the half bridges. The transistors are actuated by a controller that controls the transistors such that the DC voltage is converted into three phase-shifted AC voltage signals, or conversely converts the three-phase AC voltage into a DC voltage in recuperative braking.

In order to achieve correspondingly extensive ranges, batteries with large energy densities are required. Short charging times necessitate high charging performances so that correspondingly high rated voltages of the batteries are sought. The currently available transistors have a limited electric strength, however, of about 600 V. Consequently, the potential battery rated voltages are restricted to about 400 V, and the corresponding external DC voltage sources are designed for 400 V.

A method for operating an inverted rectifier of a three-phase drive of an electric automobile as an onboard charger is known from EP 593 472 B1, wherein two bridge branches of this inverted rectifier are regulated as boost converters during a charging operation such that, depending on a chiefly sinusoidal, low-harmonic power supply with cos φ=1, a DC voltage is injected into a DC link capacitor of the inverted rectifier, and wherein another bridge branch of this inverted rectifier is regulated as a buck converter such that, depending on a charging characteristic of a traction battery of the electric automobile, a charging current from the DC link capacitor is injected into the traction battery. In an alternative embodiment, a bridge branch of this inverted rectifier is regulated as a boost converter during a charging operation such that, depending on a charging characteristic of a traction battery of the electric automobile, a charging current from the DC link capacitor is injected into the traction battery.

A charging system is known from DE 10 2009 033 185 B4 for charging a battery of a vehicle with a converter that is connected at its DC voltage side to a battery for converting the DC voltage supplied by a battery into a variable AC voltage that can be used for an electric motor to drive the vehicle. Moreover, the charging system has a switching unit that is connected to the AC voltage side of the converter and to the switching unit for connecting an external power supply network to the converter. In this case, the switching unit is provided between the converter and the electric motor to disconnect the connection before the converter is used as a charger for the battery, wherein a voltage adaptation module of the converter is provided to create a charging characteristic of the charging system according to the battery charging requirements. Moreover, the converter comprises a DC link whose voltage value is raised above a voltage value of the external power supply network, wherein the converter is designed such that no high currents flow to the external power supply network when plugging in the power grid charging connection. Moreover, the charging system comprises an enabling switching apparatus for releasing a fuel filler flap of the vehicle and for unlocking the at least one power grid charging connection when the voltage increasing apparatus has increased the voltage of the DC link to a higher voltage than the external power supply network.

SUMMARY

An object thus exists of creating a device for a voltage supply by means of which a faster charging is possible with a given external DC voltage source. Another object is the creation of a suitable traction network for an electric or hybrid vehicle, as well as the provision of a method for charging a battery in a traction network.

A solution to the above objects results from a device, a traction network, as well as a method according to the independent claims. Embodiments of the invention are described in the dependent claims and the following description.

In one aspect, a device for converting voltage comprises a converter and a controller, wherein the converter has a two-pole DC voltage connection for connecting a battery, and a three-pole AC voltage connection for connecting an electric machine. Moreover, the converter has three half bridges, wherein two transistors with freewheeling diodes are arranged both in the upper as well in the lower part of each half bridge. The center taps of the half bridges may be connectable to the AC voltage connection, or are connected thereto. A DC link capacitor is arranged parallel to the DC voltage connection and comprises of at least two series-connected capacitors, wherein the common connecting point forms a neutral point.

DETAILED DESCRIPTION

Figure 1:
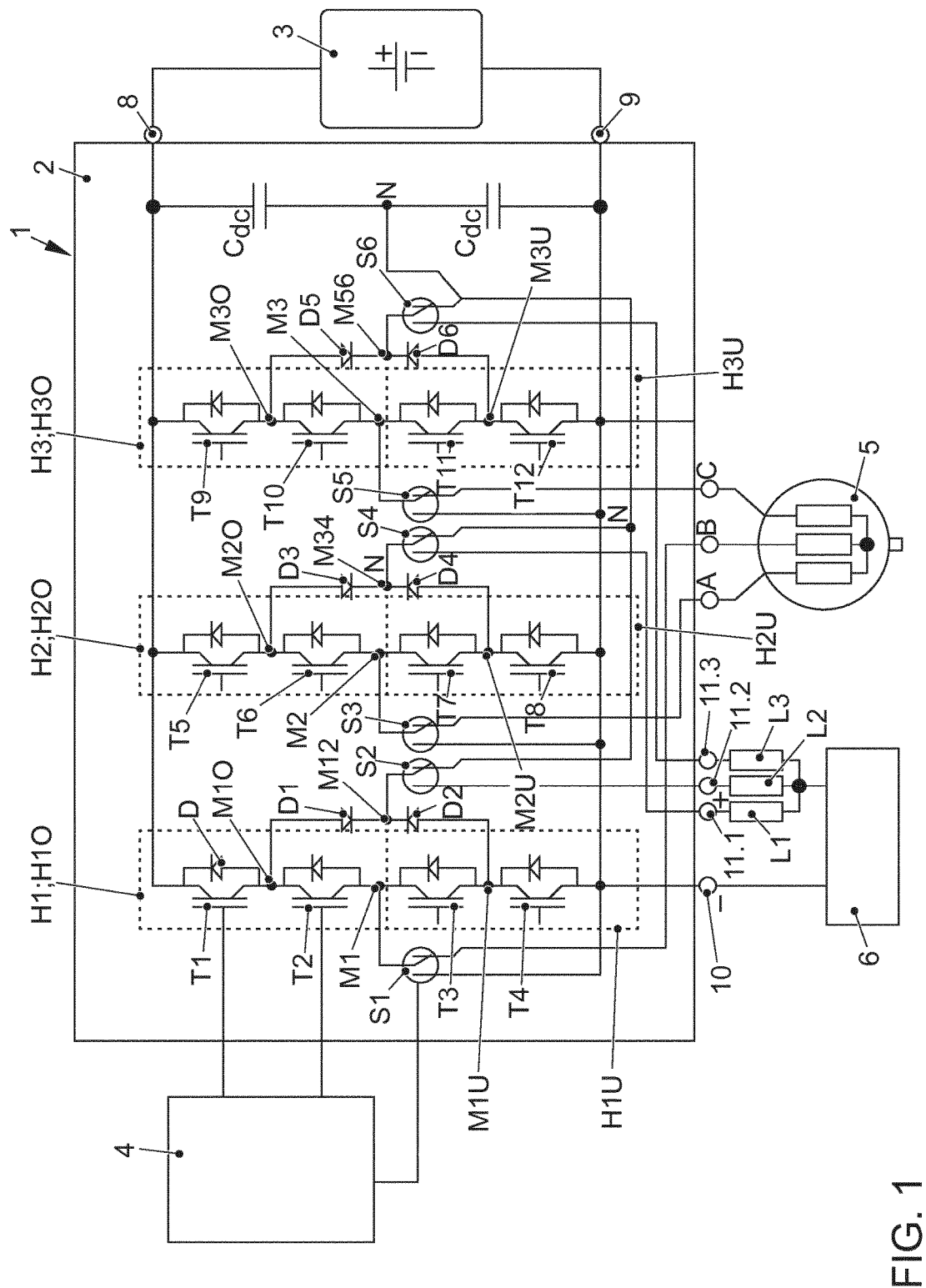
FIG. 1 shows a traction network of an electric or hybrid vehicle.

As discussed in the preceding and in one aspect, a device for converting voltage comprises a converter and a controller, wherein the converter has a two-pole DC voltage connection for connecting a battery, and a three-pole AC voltage connection for connecting an electric machine. Moreover, the converter has three half bridges, wherein two transistors with freewheeling diodes are arranged both in the upper as well in the lower part of each half bridge. The center taps of the half bridges may be connectable to the AC voltage connection, or are connected thereto. A DC link capacitor is arranged parallel to the DC voltage connection and comprises of at least two series-connected capacitors, wherein the common connecting point forms a neutral point.

A plurality of capacitors may be parallel-connected, wherein the two parallel circuits may be series-connected.

Moreover, two diodes may be assigned in each case to the half bridges, wherein the two diodes are series-connected and connect central taps of the upper and lower part of the half bridge. An anode of a first diode may be connected to the central tap of the lower part, and the cathode of the other diode may be connected to the central tap of the upper part. The central taps of the diodes are connected or connectable to the neutral point.

At least one half bridge may have two switching elements. The first switching element may connect the central tap between the two diodes to the neutral point in a first switched position, and the central tap between the diodes to a positive charging connection for an external DC voltage source in a second switched position. The second switching element may connect the central tap of the half bridge to a pole of the AC voltage connection in a first switched position, and the central tap of the half bridge to the negative pole of the DC voltage connection in a second switched position. The controller may be designed to control the switching elements from the first to the second switched position depending on an intended external charging process.

By using four transistors per half bridge in each case, the rated voltage of the battery can be correspondingly chosen to be twice as large. For example, a battery with a rated voltage of 800 V can be chosen.

Another benefit is that a 3-level converter topology is achieved so that the more favorable properties for the edge steepness of the voltage lessen the demand for machine-side windings. Given a correspondingly modified pulse pattern, harmonious current components can be eliminated in a targeted manner which improves the overall efficiency of the electric machine since harmonics generally do not contribute to the formation of torque.

The battery may be charged by an external DC voltage source with a rated voltage less than the rated voltage of the battery in that the transistors are operated during charging operation (second switched position) in the upper part of the half bridge as a DC/DC step-up converter. This allows for example the battery with an 800 V rated voltage to be charged by an external DC voltage source with a 400 V rated voltage. This enables fast charging times with a strong charging performance. The inductor needed for the step-up converter can be provided for example by the external DC voltage source. The necessary size or rating of the inductor depends on the switching frequency of the transistors, since the impedance is $j\omega L$.

In one embodiment, each half bridge is assigned two switching elements, so that the charging output can be distributed to three branches. In so doing, the step-up converters can be switched on at a delay from each other, which reduces a ripple formation.

In another embodiment, the switching elements are designed as a relay, so that galvanic isolation is achievable.

In another embodiment, the transistors are designed as IGBTs, since they have a higher electric strength in comparison to MOSFETs.

In another embodiment, the required inductor is arranged between the positive charging connection and the central tap of the half bridge, so that no special adaptations to the external DC voltage source are necessary.

Reference is made to the entire contents of the preceding embodiments with regard to the formation of the traction network, as well as the method for charging the battery.

The invention is explained in more detail in the following with reference to the FIGS.

The traction network 1 comprises a converter 2, a battery 3, a controller 4 and an electric machine 5. Moreover, an external DC voltage source 6 is shown that however is not part of the traction network 1.

The converter 2 has twelve transistors T1-T12 that are each assigned a freewheeling diode D, wherein only the freewheeling diode D of the first transistor T1 is provided with a reference number. The transistors T1-T12 are actuated by the controller 4, wherein for reasons of clarity only the control lines to transistors T1 and T2 are shown. The transistors T1-T4 form a first half bridge H1, the transistors T5-T8 a second half bridge H2, and the transistors T9-T12 a third half bridge H3. Each half bridge H1-H3 has an upper part H1O-H3O and a lower part H1U-H3U, wherein the upper parts H1O-H3O are formed by the transistors T1, T2, T5, T6 as well as T9, T10. Between the upper part H1O-H3O and the respective lower part H1U-H3U is a central tap M1-M3 of the respective half bridge H1-H3. The converter 2 moreover has a two-pole DC voltage connection with a positive pole 8 and a negative pole 9, wherein the battery 3 is connected to the DC voltage connection. A DC link capacitor is arranged parallel to the DC voltage connection and consists of a series circuit of two capacitors Cdc, wherein the common connecting point defines a neutral point N. Moreover, the converter 2 has a three-pole AC voltage connection whose three poles A, B, C are connected to the three winding connections of the electric machine 5. Finally, the converter 2 additionally has six switching elements S1-S6 as well as six diodes D1-D6. In this case, the switching elements S1-S2 are assigned to the first half bridge H1, the switching elements S2-S4 are assigned to the second half bridge H2, and the switching elements S5-S6 are assigned to the third half bridge H3. The switching elements S1-S6 are also actuated by the controller 4, wherein for reasons of clarity only the control line to the first switching element S1 is shown.

The switching elements S1-S6 each have a first switched position and a second switched position, wherein the first switched position is shown in FIG. 1. In the first switched position, the switching elements S1, S3, and S5 connect the central taps M1-M3 to the poles A, B, C of the AC voltage connection, wherein M1 is connected to B, M2 is connected to A, and M3 is connected to C. In the second switched position, the central taps M1-M3 are connected to the negative pole 9 of the DC voltage connection. The diodes D1 and D2 are series-connected, wherein the cathode of the first diode D1 is connected to a central tap M1O of the upper part H1O of the first half bridge H1. The anode of the second diode D2 is connected to a central tap M1U of the lower part H1U of the first half bridge H1, wherein the common connecting point of the diodes D1, D2 forms a central tap M12. The diodes D3-D6 are correspondingly interconnected and define central taps M34 and M56. In the first switched position, the switching elements S2, S4, and S6 connect the central taps M12, M34 and M56 to the neutral point N.

In the first switched position of the switching elements S1-S6, the controller 4 can actuate the transistors T1-T12 (for example by a corresponding pulse pattern), such that a three-phase AC voltage is generated for the electric machine 5 from the DC voltage of the battery 3. In so doing, a 3-level converter can be realized since four transistors per half bridge H1-H3 are then available. The transistors T1-T12 therefore only have to switch just half of the DC link voltage, which realizes the known benefits of the 3-level converter with regard to the currents. For example, the rated voltage of the battery 3 can thus be increased to 800 V, wherein the transistors T1-T12 only have to have an electric strength of 600 V since they have to switch at most 400 V in each case.

In the first switched position, the battery 3 can also be charged by the electric machine 5 when it is operated like a generator in recuperative braking.

In order to charge the battery 3 via the external DC voltage source 6, the converter 2 has one negative charging connection 10 and three positive charging connections 11.1-11.3, wherein the three charging connections 11.1-11.3 run to the positive pole of the DC voltage source 6 via three external inductors L1-L3. To charge the battery 3 via the external DC voltage source 6, the switching elements S1-S6 are switched to the second switched position by the controller 4. In the second switched position, the switching elements S1, S3 and S5 connect the central taps M1, M2, M3 to the negative pole 9 that is also connected to the negative pole of the external DC voltage source 6 via the negative charging connection 10.

In the second switched position, the switching elements S2, S4, and S6 connect the central taps M12, M34, M56 to the positive charging connections 11.1-11.3. The diodes D2, D4, and D6 are therefore poled in reverse direction.

Figure 2:
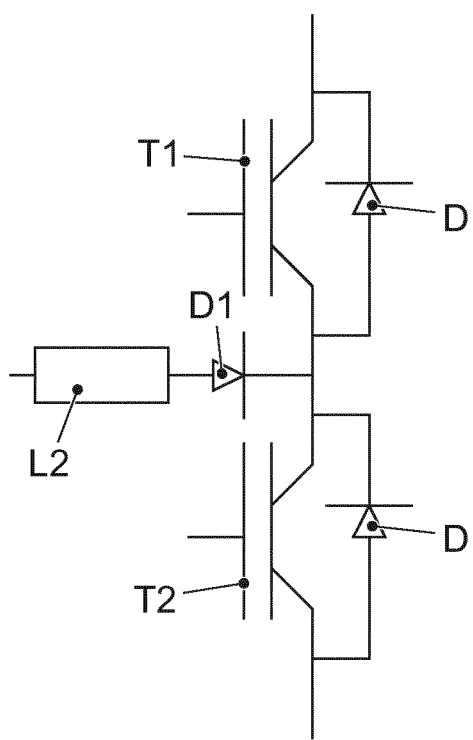
FIG. 2 shows a detailed view of a step-up converter in the second switched position.

For example, for the upper part H1O of the first half bridge H1 this thereby yields the interconnection shown in FIG. 2, which corresponds to a DC/DC step-up converter. For the charging cycle, T2 is switched through and T1 is blocked. In the discharging cycle, T2 is then blocked and T1 is switched through. By means of the DC/DC step-up converter, a rated voltage of 400 V of the external DC voltage source 6 can then for example be stepped up to a voltage of 800 V. Thus a traction network 1 with a rated voltage of about 800 V can be realized, wherein the transistors T1-T12 have a lower electrical strength (such as 600 V), and the external charging infrastructure is also designed for lower rated voltages (such as 400 V). By interconnecting all three upper parts H1O, H2O, H3O of the half bridges H1, H2, H3 as a DC/DC step-up converter, the current is evenly distributed, which is in particular beneficial with regard to the power loss to be dissipated.

The transistors T1-T12 may be designed as IGBTs, and the switching elements S1-S6 may be designed as relays. The inductors L1-L3 can also be integrated here in the converter 2.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A device for converting voltage comprising a converter and a controller, wherein the converter has a two-pole DC voltage connection for connecting a battery and a three-pole AC voltage connection for connecting an electric machine, wherein the converter has three half bridges wherein two transistors with freewheeling diodes are arranged in the upper part as well as in the lower part of each half bridge, wherein central taps of the half bridges are connectable to the AC voltage connection and a DC link capacitor is arranged parallel to the DC voltage connection and consists of at least two series-connected capacitors, wherein the common connecting point forms a neutral point, wherein the half bridges are assigned two diodes, wherein the two diodes are series-connected and connect central taps of the upper part and the lower part of the half bridges, wherein at least one half bridge is assigned two switching elements, wherein the first switching element, when in a first switched position, connects a central tap between the two diodes to the neutral point and, when in a second switched position, connects the central tap between the two diodes to a positive charging connection for an external DC voltage source, wherein the second switching element, when in a first switched position, connects the central tap of the half bridge to a pole of the AC voltage connection and, when in a second switched position, connects the central tap of the half bridge to the negative pole of the DC voltage connection, wherein the controller is designed to control the switching elements from the first switched position to the second switched position depending on an intended external charging process.

2. The device according to claim 1, wherein all three half bridges are each assigned two switching elements, wherein the controller is designed such that the transistors of the upper parts of the various half bridges are actuated phase-shifted from each other.

3. The device according to claim 1, wherein the switching elements are designed as relays.

4. The device according to claim 1, wherein the transistors are designed as IGBTs.

5. The device according to claim 1, wherein an inductor is arranged between the positive charging connection and the central tap of the half bridge.

6. A traction network in an electric or hybrid vehicle, comprising a device according to claim 1, wherein a battery is connected to the DC voltage connection, and an electric machine is connected to the three-pole AC voltage connection.

7. A method for charging a battery in a traction network according to claim 6, wherein a positive pole is connected to the positive charging connection and a negative pole of an external DC voltage source is connected to the negative charging connection, wherein the rated voltage of the external DC voltage source is lower than the rated voltage of the battery, wherein the controller controls the switching elements from the first to the second switched position and actuates the transistors in the upper part of the half bridge as a DC/DC step-up converter.

* * * * *